United States Patent [19]

Phillips

[11] Patent Number: 5,743,955
[45] Date of Patent: Apr. 28, 1998

[54] METHOD FOR SYNTHESIZING FINE-GRAINED PHOSPHOR POWDERS OF THE TYPE $(RE_{1-x}LN_x)(P_{1-y}V_y)O_4$

[76] Inventor: Mark L. F. Phillips, 83 Lagarto Rd., Tijeras, N. Mex. 87059

[21] Appl. No.: 546,655

[22] Filed: Oct. 23, 1995

[51] Int. Cl.$^6$ .................................................. C30B 25/02
[52] U.S. Cl. ........................................ 117/2; 117/3; 117/7
[58] Field of Search ................................ 117/2, 3, 5, 7, 117/925, 937; 252/1; 423/263

[56] References Cited

U.S. PATENT DOCUMENTS

| | | | |
|---|---|---|---|
| 3,479,296 | 11/1969 | Kauders | 252/301.4 |
| 3,511,785 | 5/1970 | Ropp et al. | 252/301.4 |
| 3,580,861 | 5/1971 | Ropp et al. | 252/301.4 R |
| 5,322,559 | 6/1994 | Sleight | 106/401 |
| 5,433,778 | 7/1995 | Sleight | 106/401 |

OTHER PUBLICATIONS

O. Yamguchi, Y. Mukaida, H. Shigeta, H. Takemura, and M. Yamashita, "Preparation of Alkoxy-Derived Yttrium Vanadate", *J. Electrochem. Soc.* 136(5), 1557–60 (1989).

R. C. Ropp and B. Carroll, Precipitation of Rare Earth Vanadates from Aqueous Solution *J. Inorg. Nucl. Chem.* 39, 1303 (1977).

*Primary Examiner*—R. Bruce Breneman
*Assistant Examiner*—Felisa Garrett

[57] ABSTRACT

A method for generating well-crystallized photo- and cathodoluminescent oxide phosphor powders. The method of this invention uses hydrothermal synthesis and annealing to produce nearly monosized $(RE_{1-x}Ln_x)(P_{1-y}V_y)O_4$ ($Ln=Ce\rightarrow Lu$) phosphor grains with crystallite sizes from 0.04 to 5 µm. Such phosphors find application in cathode-ray tube, flat-panel, and projection displays.

17 Claims, 2 Drawing Sheets

10 μm

1 μm

10 μm

METHOD FOR SYNTHESIZING FINE-GRAINED PHOSPHOR POWDERS OF THE TYPE $(RE_{1-x}LN_x)(P_{1-y}V_y)O_4$

This invention was made with Government support under Contract No. DE-AC04-94AL85000 awarded by the United States Department of Energy. The Government has certain rights in the invention.

BACKGROUND OF THE INVENTION

Field of the Invention

Flat-panel displays (FPDs) for portable computers are largely liquid crystal displays (LCDs). Emissive FPD technologies such as field emitter (FED), electroluminescent (OLD), and vacuum fluorescent (VFD) displays are expected to compete with active matrix LCD's (AMLCDs) for use in portable monitors. Full color FEDs are expected to realize lower power consumption and improved screen appearance. As in a conventional cathode ray tube (CRT), FEDs use electron beams to excite cathodoluminescent phosphors deposited on a screen, but while a color CRT forms an image by rastering beams from three thermionic electron guns of microscopic cold cathodes to irradiate a phosphor screen. Such arrays can contain as many as $10^7$ emitters/cm$^2$, so that thousands of emitters can be used to light a single pixel.

A significant difference between a CRT and a FED is in the operating voltage. The electron guns in a CRT display produce electrons at high energy (typically 10–25 keV). FEDs are operated at lower voltages for several reasons. Principally, the screen must be held a short distance (40–100 μm) from the cathode array to minimize cross-talk (unintentional irradiation of neighboring pixels). This causes a large potential gradient, and limits voltages to less than ≅1000 V to prevent vacuum breakdown. In addition, supplying high operating voltages to $10^9$ cathodes in a monitor screen would require costly, bulky driver circuitry, and could constitute a safety hazard.

A major drawback to using lower voltages is reduced phosphor performance. Most phosphors are inefficient at low voltages, principally due to surface bound electrons (SBEs) and surface recombinant (SR) centers. SBEs cause the surface of the phosphor grain to acquire a negative charge, which repels or deflects the incoming electrons. SR centers are surface defects at which excitons created by electron impact can decay nonradiatively; defects can be caused by surface contamination or grinding. The use of higher current densities to compensate for loss of efficiency at low excitation voltage can also lead to saturation and/or damage. Sulfide phosphors, which offer the highest luminescent efficiencies in full color, can release damaging sulfur-containing gases under low-energy electron irradiance resulting in damage to the phosphor grain, and contamination of the field emitter tips changing their work function, increasing or decreasing emission current, or causing arcing.

Oxide phosphors are cleaner, but the selection for those that are efficient at low voltages is scanty. ZnO:Zn is unusual among oxide phosphors in that it is a conductor rather than an insulator. Its visible cathodoluminescence is blue-green; efficiencies of up to 13 lm/W have been reported. $ZnGa_2O_4$ is a candidate for a low-voltage blue phosphor. Red oxide phosphors include traditional materials such as $Y_2O_3$:Eu, $YVO_4$:Eu, $Y_3Al_5O_{12}$ (YAG):Cr, $Zn_3(PO4)_2$:Mn, and some newer materials such as $CaTiO_3$:Pr. So far, though, no obvious low-voltage red oxide phosphors have emerged.

SUMMARY OF THE INVENTION

The present invention relates generally to phosphor powders and more particularly to a method of preparing fine-grained yttrium orthovanadate crystals doped with europium.

Hydrothermal synthesis is a route to producing well-crystallized oxide powders with good control over particle size distribution. Among others, these criteria are key to optimizing phosphor performance. Phosphors and host phases that have been synthesized hydrothermally include $Y_3Al_5O_{12}$(YAG), $ZnGa_2O_4$, $Zn_2SiO_4$:Mn, $Y_2O_3$, and $YVO_4$:Eu.

Once a phosphor has been synthesized, it must be annealed for maximum brightness. Prior to annealing, $YVO_4$:Eu precipitated from aqueous solution below 100° C. has a photoluminescent brightness of about 40% of the final, annealed product. The cathodoluminescent brightness of unannealed $YVO_4$:Eu prepared by this process is negligible. The effect of annealing is to cause intraparticle sintering which increases the probability of radiative transition of the excited activator ion, typically Eu or Dy.

The present invention targets phosphors based on $YVO_4$, $YPO_4$, and their solid solutions, because they may be readily synthesized either hydrothermally or via traditional high-temperature methods. Other rare earth (RE) hosts such as La and Gd may substitute for Y. The photoluminescent efficiency of annealed hydrothermally derived $YVO_4$:Eu exceeds that of $YVO_4$:Eu made via solid state routes at high temperature. The synthesis of $YVO_4$:Eu of this invention was accompanied by the characterization of its low-voltage cathodoluminescent (CL) properties, and the changes in structure upon annealing with luminescence. $YVO_4$:Eu was synthesized over a range of activator concentrations, and the relationship between CL intensity and activator concentration, and CL efficiency as a function of excitation power and voltage was established. Key to the invention is the ability to control final particle size by altering crystallization and annealing temperatures.

BRIEF DESCRIPTION OF THE DRAWINGS

The accompanying drawings which are incorporated in, and form part of, the specification illustrate embodiments of this invention and, together with the description, serve to explain the principles of the invention.

DESCRIPTION OF THE PREFERRED EMBODIMENTS

According to preferred embodiments of this invention, a system is provided for hydrothermally synthesizing efficient, fine-grained phosphors of $(RE_{1-x}Ln_x)(P_{1-y}V_y)O_4$ (Ln=Ce→Lu) to be used, for example, in emissive flat-panel display systems operating in full color. The following examples are provided as illustrative of the present invention and are not intended to limit its scope in any way.

GENERAL EXAMPLE $(RE_{1-x}Ln_x)(P_{1-y}V_y)O_4$ (Ln=Ce→Lu) is prepared by treating a mixture of soluble salts of yttrium (or other rare earth host), lanthanide dopant ion, salt or oxide of vanadium (+5) and/or phosphorus (+5), and deionized water with an alkali until precipitation is complete. Alternately, the oxides of the rare earth host and/or dopant and/or vanadium are dissolved separately in hydrochloric acid. These solutions are combined and precipitated with an alkaline solution of hydrogen peroxide. Molar ratios of (P,V) to (Y,Ln) between 1 and 2 may be used, with ratios between 1 and 1.5 being most desirable. The resulting suspension is heated at or below 100° C. with stirring, or autoclaved for 1–3 days at a temperature between 100°–600° C. in order to increase the size of the $(RE_{1-x}Ln_x)(P_{1-y}V_y)O_4$ crystallites. After the reaction vessel has cooled, the products are recovered by filtration. This process yields white powders that are determined to be pure $(RE_{1-x}Ln_x)(P_{1-y}V_y)O_4$ by powder X-ray diffraction. The crystallite sizes of the materials as-synthesized increase with processing temperature as described in the following examples. After recovery, the powders are annealed at a temperature between 900° and 1300° C. that is selected according to the desired grain size of the product, and by the crystallite size of the powders before annealing. After annealing, the crystallites are separated from one another by lightly grinding in water or a deflocculant solution, then sonicating the solution. This suspension is then filtered, washed, and dried.

EXAMPLE 1

$Y_{0.95}Eu_{0.05}VO_4$ is prepared by dissolving 3.47 g $Y(NO_3)_3 \cdot 5H_2O$, 0.223 g $Eu(NO_3)_3 \cdot 6H_2O$, and 1.17, $NH_4VO_3$ in 9.0 mL deionized water. This solution is added to the Teflon cup of a Parr bomb and treated with 3.60 g guanidine carbonate $((CH_2)_3)_2CO_3$. After the bomb is closed, the resulting suspension is held at 200° C. in a pressure vessel for 5 days. After cooling, the bomb is reopened, and the product recovered by filtration. The product is then immersed in a 2% aqueous $Na_2CO_3$ solution at 90° C. for several hours to remove any traces of excess $V_2O_5$. This procedure yields 1.65 grams of a white powder that was determined by powder X-ray diffraction to be pure $Y_{0.95}Eu_{0.05}VO_4$ with an average crystallite size of 360 Å.

Figure 1:
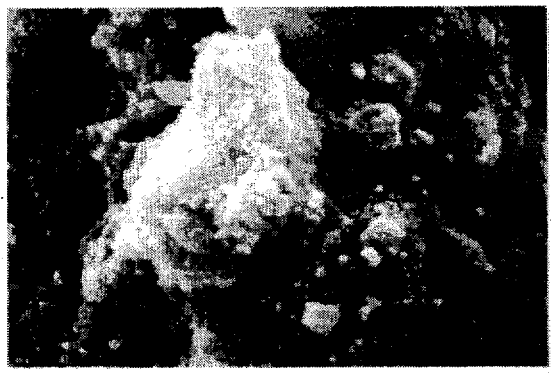
FIG. 1 shows a scanning electron microscope photograph of $YVO_4$:Eu crystallized from aqueous solution at 200° C.
Figure 2:
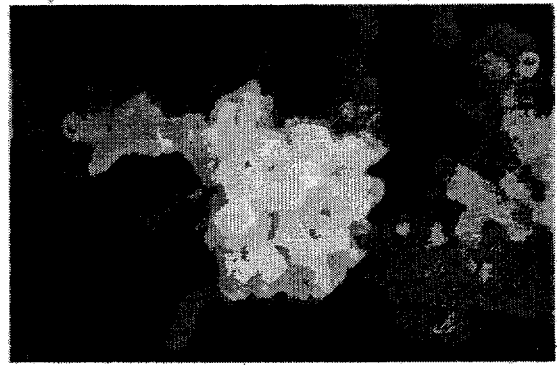
FIG. 2 shows hydrothermally crystallized $YVO_4$:Eu, annealed at 1040° C.
Figure 3:
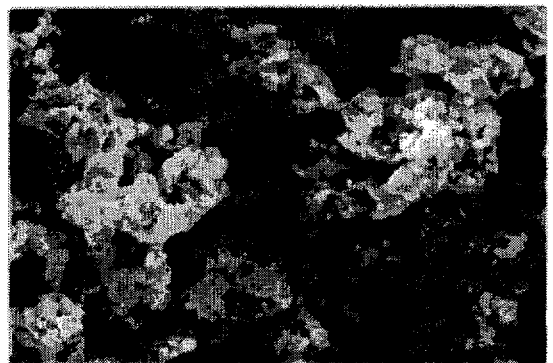
FIG. 3 shows hydrothermally crystallized $YVO_4$:Eu, annealed at 1150° C.
Figure 4:
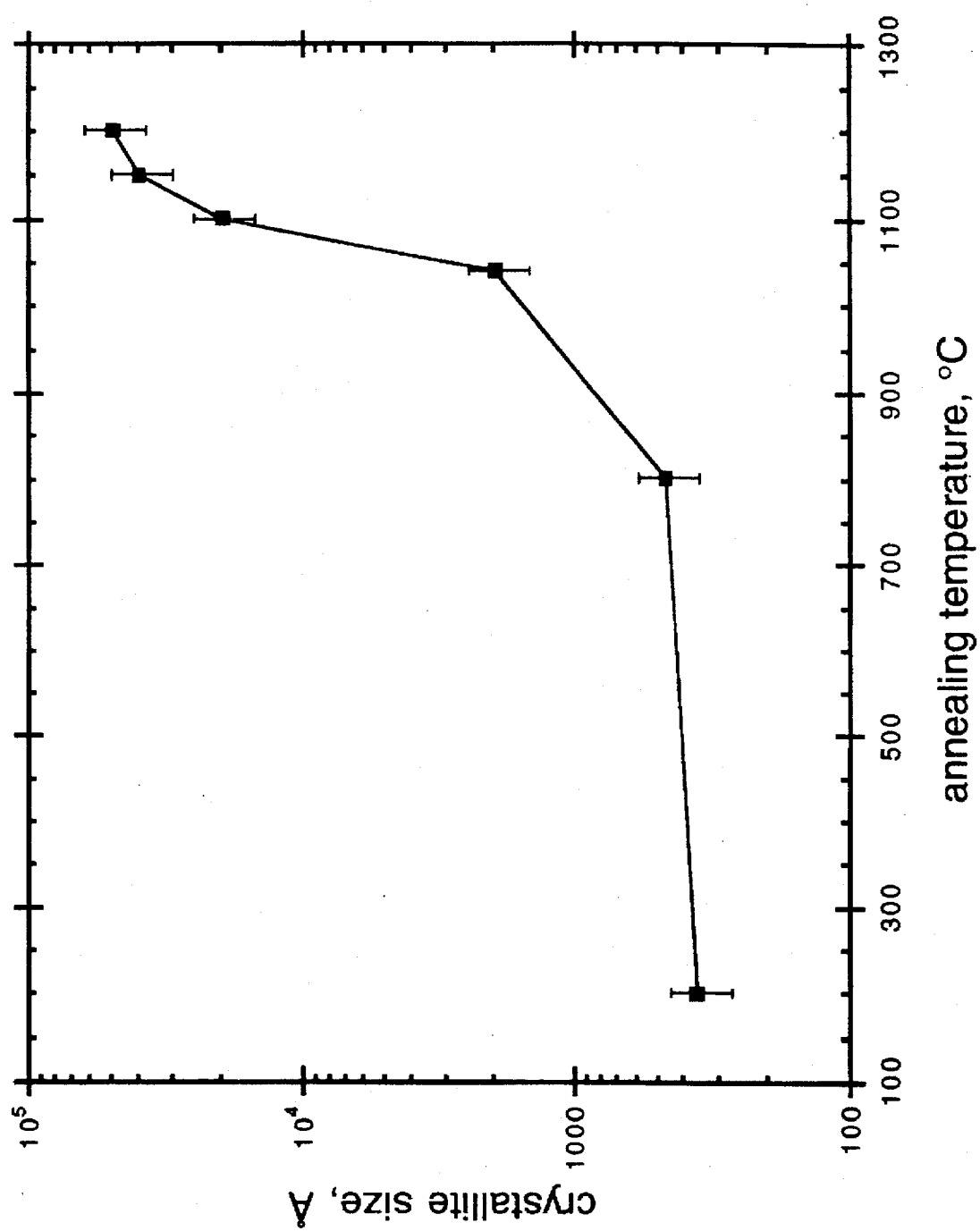
FIG. 4 shows the effect of annealing temperature on crystallite size of $YVO_4$:Eu hydrothermally crystallized at 200° C.

Crystallite size of the (Y,Ln)VO4 powders crystallized at 200° C. increases upon annealing as indicated in FIG. 2. For example, crystallite size is increased to 0.2 µm by annealing in a Pt crucible or sealed Au tube at 1040° C. for 3 hr, then cooling to room temperature at a rate of 5° C./min. Similarly, 4-µm diameter crystallites are obtained by increasing maximum temperature to 1150° C., leaving the other parameters unchanged (FIG. 1). Crystallites are separated by lightly grinding in an aqueous solution containing one weight percent sodium hexametaphosphate, then sonicating the suspension. This suspension is then filtered, washed, and dried.

EXAMPLE 2

$Y_{0.997}Dy_{0.003}VO_4$ is prepared by adding $Y_2O_3$ and $Dy_2O_3$ in the proportion 0.997 Y/0.003 Dy to 6N HCl, which is heated and stirred until dissolution is complete. The solution is diluted with additional HCl to yield a solution 1.0 molar in (Y,Dy). A solution of vanadium oxide is prepared separately by dissolving $V_2O_5$ in concentrated (12N) HCl to yield a solution 1.05 molar in V. Twenty-mL quantities of each solution are combined. While heating and stirring this solution, an aqueous solution containing 20% $NH_4OH$ and 7% $H_2O_2$ is slowly added until precipitation is complete. This suspension is recovered by filtering, washing, and drying. This procedure yields 4.00 g of a very weakly crystalline material that is converted to 0.5 µm crystallites of pure $YVO_4$:Dy (determined by powder X-ray diffraction) by annealing at 1100° C. for 2 hr in a fused silica crucible. Crystallites are separated from one another by lightly grinding in a 1% sodium hexametaphosphate solution, followed by sonication, filtration, and drying.

EXAMPLE 3

$La_{0.95}Ce_{0.05}PO_4$ is prepared by dissolving $La_2O_3$ and $Ce(NO_3)_3 \cdot 6H_2O$ in the proportion 19/1 in sufficient 6N HCl to yield a solution with a lanthanide concentration of 1.00M. This mixture is heated and stirred until dissolution is complete and then added in equal volume to 2M $H_3PO_4$ in water while continuing to heat and stir. The precipitate is filtered and dried, added to an equal weight of water, and heated to 600° C., allowing to pressurize at 2500 bar, in an autoclave. After 24 h the autoclave is allowed to cool, and the contents are recovered by filtration. The product consists of 2-µm well-faceted crystallites of pure $La_{0.95}Ce_{0.05}PO_4$ (determined by powder X-ray diffraction). This powder is annealed at 1000° C. for 2 h in an alumina crucible.

What is claimed is:

1. A method comprising preparing well-crystallized photo- and cathodoluminescent oxide phosphor powders of a desired size using hydrothermal synthesis and annealing to produce nearly monosized $(RE_{1-x}Ln_x)(P_{1-y}V_y)O_4$ (Ln=Ce→Lu; 0<x<1; 0≤y≤1) phosphor grains comprising the steps of:

(a) preparing a mixture of aqueous solutions of compounds of a rare earth (RE), a lanthanide (Ln), and vanadium and/or phosphorus, wherein the RE and Ln are different elements, (b) treating the mixture with an alkali until precipitation is complete, (c) heating the precipitate in an aqueous medium to a maxiumum of about 600° C.

(d) recovering the precipitate from the solution, (e) annealing the dried precipitate by heating it to the range of about 900° C. to about 1300° C. to achieve the desired crystallite size, and (f) deaggregating the dried precipitate.

2. The method of claim 1 wherein the compound is a soluble salt.

3. The method of claim 1 wherein the compound is an oxide.

4. The method of claim 3 wherein the oxide is dissolved in an aqueous acid.

5. The method of claim 1 wherein deaggregation is accomplished by grinding.

6. The method of claim 1 wherein deaggregation is accomplished by sonication.

7. The method of claim 1 wherein the rare earth is yttrium.

8. The method of claim 1 wherein the rare earth is lanthanum.

9. The method of claim 1 wherein the rare earth is gadolinum.

10. The method of claim 1 wherein the ratio of the molar sum of phosphorus and vanadium to the molar sum of rare earth and lanthanide is from about one to about two.

11. The method of claim 1 wherein the lanthanide is selected from those elements of the periodic table consisting of cerium through lutetium in atomic number sequence.

12. The method of claim 1 wherein the mixture is precipitated with an aqueous solution containing an alkali and an oxidizing agent.

13. The product made by the method of claim 1.

14. The method of claim 1 wherein deaggregation occurs in water or a deflocculant solution.

15. The method of claim 14 further including the step of isolating, washing, and drying the deaggregated precipitate.

16. The method of claim 15 wherein deaggregation is accomplished by sonication.

17. The method of claim 14 wherein deaggregation is accomplished by sonication.

* * * * *